United States Patent Office 2,878,243
Patented Mar. 17, 1959

2,878,243

PROCESS FOR PREPARING SULFUR COMPOUNDS

Johannes Blickman, San Rafael, and George L. Weamer, Berkeley, Calif., assignors to California Research Corporation, San Francisco, Calif., a corporation of Delaware No Drawing. Application January 8, 1957
Serial No. 632,981

5 Claims. (Cl. 260—139)

This invention relates to a novel process for preparing useful sulfur compounds. More particularly, the invention is directed to a superior new process for preparing sulfur-containing derivatives of paraffin wax useful as additives for lubricant compositions.

Sulfur-containing derivatives of paraffin wax are widely used in the inhibition of oxidation and/or corrosion in lubricant compositions such as lubricating oils and greases. These sulfur compounds are also sometimes referred to as sulfur-containing derivatives of high molecular weight hydrocarbons and, more specifically, as sulfurized diparaffin wax polysulfides. They are generally characterized by long-chain aliphatic hydrocarbon groups, usually of the paraffin wax type, and sulfur in the form of connecting linkages of one or more sulfur atoms between the hydrocarbon groups or in the form of a sulfur substituent on a hydrocarbon group.

The effectiveness of the sulfur-containing derivatives of paraffin wax as oxidation and/or corrosion inhibitors is dependent to a considerable degree on the amount of sulfur present in the compound. It is also important that the sulfur be present in proper combination with the long-chain aliphatic hydrocarbon or paraffin wax groups. Free sulfur and sulfur which is too loosely bound is overly corrosive to metal surfaces coming into contact with compositions containing the sulfur compounds. On the other hand, sulfur which is too firmly combined with the hydrocarbon groups is substantially unreactive and, therefore, ineffective in the inhibition of oxidation and/or corrosion.

Sulfur-containing derivatives of paraffin wax of the foregoing type may be prepared by reacting halogenated paraffin wax with an inorganic sulfide such as sodium sulfide. Additional sulfur may be combined with the diparaffin wax sulfide thus obtained by a further sulfurizing step in which the diparaffin wax sulfide is heated with sulfur for a definite period of time under certain temperature and pressure conditions. Unfortunately, the reaction of the halogenated paraffin wax and the inorganic sulfide is usually slow, and the amount of sulfur which can be added by this means is limited. The extra step of combining additional sulfur with the diparaffin wax sulfide product also involves certain disadvantages. More equipment, such as reactors, pumps and storage vessels is needed, thus adding to the overall cost of the process. Furthermore, the color of the product is undesirably darkened due apparently to the extra processing steps.

Attempts to prepare effective sulfur-containing derivatives of paraffin wax having greater sulfur contents by a more direct and less expensive single-step process have not been successful heretofore. This is so even though somewhat stringent reaction conditions involving long reaction times, and higher temperatures and pressures are employed. When free sulfur and inorganic sulfide are reacted with halogenated paraffin wax under the generally accepted optimum conditions, the products are relatively poor corrosive inhibitors due to the presence of too tightly bound sulfur. Furthermore, when increased amounts of free sulfur are added in attempts to produce more readily available types of sulfur in the product, unsuitable rubbery products are obtained. The solubilities of the rubbery products are so limited that it is difficult to incorporate them in lubricant compositions in the desired amounts. The rubbery nature of such products also makes them difficult to process, thus contributing to the amount of impurities of an objectionable nature, such as sludgy by-products of the reaction and unreacted free sulfur in the final product.

It has now been found that excellent sulfur-containing derivatives of paraffin wax having a high sulfur content can be successfully prepared by a distinctly different one-step process utilizing mild reaction conditions wholly unlike the generally stringent reaction conditions commonly employed heretofore to obtain a satisfactory product. This superior new one-step process comprises reacting a halogenated paraffin wax with sulfur and an inorganic sulfide at a temperature of from about 200 to about 250° F. and a pressure of from about 10 to about 50 pounds per square inch gauge for a period of from about two to about ten hours in the presence of a lower aliphatic alcohol.

The sulfur-containing derivatives of paraffin wax prepared according to the process of this invention have an unusually high sulfur content. They are remarkably effective in the inhibition of oxidation and/or corrosion in lubricant compositions. The sulfur is present in stable and effective form. Much shorter reaction times are needed compared to processes used before and costs are thereby greatly reduced. The expense of extra equipment for combining additional sulfur in a second step is avoided. The product is soluble in lubricant compositions and is sufficiently fluid to lend itself to any purification steps which may be necessary.

The halogenated paraffin wax employed in the process of the invention is a well-known type of material in the field of additives for lubricant compositions. Such materials which are particularly suitable for present purposes are the halogenated derivatives of normally solid, saturated long-chain aliphatic hydrocarbons and mixtures thereof containing an average of from about 20 to about 30 carbon atoms. The halogen content preferably is within a range of from about 15 to about 30 percent by weight. Still more preferred for present purposes are the chlorinated paraffin wax derivatives containing from about 20 to about 25 percent by weight of chlorine.

The halogenated paraffin wax is conveniently obtained by halogenating a suitable paraffin wax. This is done, for example, by passing chlorine gas into molten paraffin wax at an elevated temperature of from about 150 to about 230° F. until the chlorine content of the chlorinated paraffin wax is about 22 percent by weight. Dissolved hydrogen chloride by-product and excess chlorine gas are readily removed by air blowing to yield a finished product of pale yellow color commonly referred to as "chlorowax."

Various paraffin waxes are used in the production of the halogenated paraffin wax. Such waxes are normally solid materials which have melting points in the range from about 100 to about 200° F. Impure mixtures of paraffin wax such as slack wax are also suitable.

The sulfur and inorganic sulfide of the process according to the present invention are also well-known classes of materials in the art. Any form of elementary sulfur is satisfactory. The inorganic sulfide is preferably an alkali metal or ammonium sulfide. Particularly preferred are the sodium sulfides such as sodium monosulfide, sodium disulfide, sodium trisulfide and hydrates thereof, for example sodium sulfide nonahydrate and sodium sulfide hydrates containing about 60 percent by weight water.

The reaction temperatures in the process are not allowed to exceed a maximum of about 250° F. The higher temperatures above this maximum which have been most often employed heretofore in the production of sulfur compounds of the present type are objectionable, since they result in the formation of a rubber-like product of limited solubility. Preferably, the temperature of the reaction is in the range from about 200 to about 250° F. with temperatures of from about 220 to about 240° F. being still more preferred for optimum yields of sulfurized diparaffin wax polysulfide having the desired physical and chemical properties.

The reaction pressures are maintained at less than about 60 pounds per square inch gauge. More extreme conditions, utilizing higher pressures, give an unsatisfactory, rubbery product of limited solubility much like the product obtained when excessively high temperatures are employed. Pressures of from about 10 to about 60 pounds per square inch gauge are particularly suitable. For present purposes, however, pressures of from about 20 to about 40 pounds per square inch gauge are the most preferred for desirable yields and quality of product.

The reaction time of the present process for preparing sulfurized diparaffin wax polysulfides is also critical and does not exceed about ten hours. Longer reaction periods like the more exhaustive high temperatures and pressures discussed in the preceding paragraphs give an unsatisfactory product. Times of from about two to about ten hours are considered satisfactory. In a preferred embodiment, the reaction period covers from about four to about six hours to insure adequate yields and products of desirable quality.

The sulfur and inorganic sulfide are reacted at the same time with the halogenated paraffin wax. The amount of sulfur and sulfide to be reacted may be varied within certain limits, depending on the quantity and type of sulfur desired in the final product. Usually from about 10 to about 30 percent by weight of the sulfur, based on the weight of the halogenated paraffin wax, and from about 15 to about 35 percent of the inorganic sulfide is satisfactory. A molar excess of the sulfur over the inorganic sulfide is particularly desirable. Preferably, the molar ratio of sulfur to sulfide is maintained in the range from about 1.5:1 to about 3:1 for products having a high sulfur content of desirable quality.

The reaction does not require any added water, as such. In fact, excess water in the process results in lower conversions. However, some water may be present in the form of hydrates of the inorganic sulfide, such as sodium sulfide hydrate (60% $Na_2S$), without harmful effects.

An alcohol is employed as solvent for the halogenated paraffin wax in the reaction. Suitable alcohols include the lower aliphatic alcohols such as methyl alcohol, ethyl alcohol, propyl alcohol, isopropyl alcohol, amyl alcohol, etc. The lower aliphatic alcohols are those of not more than 7 carbon atoms. For present purposes, ethyl alcohol is the preferred solvent. Usually, proportions of about one to three volumes of alcohol for each volume of chlorinated wax are quite satisfactory.

The sulfur-containing derivatives of paraffin wax prepared in the process of the invention may be separated from the reaction mixture by several different means. The reaction mixture may be allowed to stratify and the impurities withdrawn in the form of a bottoms sludge. Any solvent such as ethyl alcohol may be conveniently removed by distillation. Other methods of purification such as solvent extraction, extractive distillation and the like may also be employed.

In a particular embodiment of the process according to the invention, the reaction mixture, including ethyl alcohol solvent, is purified by first subjecting it to a distillation step in which the alcohol is distilled off. Water, approximately equal in volume to the amount of halogenated paraffin wax employed in the reaction, is then added to the mixture and agitated at a temperature of about 280 to 290° F. and a pressure of about 35 to 45 pounds per square inch gauge. The mixture is allowed to settle and the water is removed by decanting and distillation. The reaction mixture is then pressure-filtered to yield a bright, clear product.

Instead of first adding water in the purification outlined above, a petroleum naphtha fraction may be added to the reaction mixture. After agitation, the resulting mixture is washed with water. The wash water is then permitted to settle and is withdrawn, following which the naphtha is removed by vacuum distillation.

The sulfurized diparaffin wax polysulfide product is characterized by an unusually high amount of sulfur, ordinarily in excess of 20 percent by weight. It is thus possible to employ smaller and more economical amounts of the product and still have a very effective oxidation and/or corrosion inhibitor for lubricant compositions.

The following examples are offered as further illustrations of the invention. Unless otherwise specified, the proportions given are on a weight basis.

EXAMPLE I 850 pounds of sulfur and 1,800 pounds of sodium sulfide hydrate (60% $Na_2S$) are charged to a steel, steam jacketed, pressure reactor along with 930 gallons of ethyl alcohol and 560 gallons of chlorinated paraffin wax having a chlorine content of about 22 percent by weight and an API gravity of 16.5 to 17.5. The reactor is equipped with a water-cooled condenser. The contents are reacted for about eight hours at 230° F. and about 40 pounds per square inch pressure gauge. The ethyl alcohol is then distilled off and the reaction mixture permitted to cool to about 200° F.

500 gallons of water are added to the reaction mixture. The contents of the reactor are then mixed while holding a temperature of about 280 to 290° F. and a pressure of about 35 to 45 pounds per square inch gauge. The mixture is allowed to settle at about 280° F. and water is withdrawn from the bottom of the reactor until the water content of the reaction mixture is below about 15 percent as indicated by a bottom sediment and water centrifuge test. The remaining water is then removed by distillation and the reaction mixture is pressure-filtered at a temperature of about 270 to about 290° F. The sulfurized diparaffin wax polysulfide product thus obtained contains about 22 percent sulfur. A diluent oil is added to dilute the product to about 17 percent sulfur content.

In an alternative purification step approximately 935 gallons of naphtha is charged to the reactor containing the reaction mixture as outlined above and mixed for about 30 minutes. Sodium chloride sludge is allowed to separate out and the supernatant naphtha solution of the reaction product is then run through a water-washing and centrifuging treatment. In this treatment the solution is contacted with about 1500 gallons of water in a centrifuge. The wash water is drawn off and discarded. Naphtha is removed from the solution by vacuum distillation to give the final product consisting of sulfurized diparaffin wax polysulfide containing about 22 percent sulfur.

Additional runs following the general procedure outlined in the above example are summarized in the following table. For the purpose of comparison, still other runs are included in the table to illustrate the effect of the higher pressures and temperatures as well as longer reaction times characteristic of the more stringent reaction conditions usually employed heretofore in the art.

Table I

| Example Number | II | III | IV | V | VI |
|---|---|---|---|---|---|
| Reaction Conditions: | | | | | |
| Temperature, °F | 220 | 260 | 280 | 275 | 230 |
| Pressure, p. s. i. g | 30 | 80 | 80 | 80 | 40 |
| Time, hours | 8½ | 8 | 8 | 12½ | 8 |
| Proportions: | | | | | |
| Chlorinated Paraffin Wax, lbs., 22% Cl | 4,480 | 4,480 | 4,480 | 975g | 4,480 |
| Sulfur, lbs | 850 | 850 | 850 | 187g | 850 |
| $Na_2S.60\%$ $H_2O$, lbs | 1,080 | 1,080 | 1,080 | 390g | 1,080 |
| Ethyl Alcohol, gallons | 930 | 935 | 929 | 1,450g | 934 |
| Method of Purification | (1) | (2) | (2) | (2) | (2) |
| Product Analysis: | | | | | |
| Sulfur, Wt. percent | 21.3 | | | | 19.4 |
| Chlorine, Wt. percent | 2.7 | | | | 2.7 |
| Yield, Wt. percent of Wax Charge | 91.5 | | | | |
| Purified Product Inspections: | | | | | |
| Color, ASTM D-155, double dilute | 5 | | | | 5 |
| Appearance | Bright | (Rubbery) | (Rubbery) | (Rubbery) | Bright |
| Solubility in Oil | Good | Poor | Poor | Poor | Good |

Small g = grams.
1 Water.
2 Naphtha.
3 Rubber product unsuitable for purification treatment.

From the illustrative data of the above table, it can be seen that the present process is surprisingly effective in the production of useful sulfur-containing derivatives of paraffin wax. The process employs but a single step and utilizes mild reaction conditions. Such factors add greatly to the efficiency of the process and greatly reduce the cost of the final product.

It is also apparent from the illustrative data that the reaction conditions are critical to the production of suitable sulfur compounds. When higher pressures and temperatures and longer periods of reaction are attempted in the one-step process, the sulfurized diparaffin wax polysulfide product is rubbery and cannot be purified. It is also unsatisfactory as an additive for lubricant compositions from the standpoint of solubility.

The effectiveness of the sulfur-containing derivatives of paraffin wax produced by the process of the invention is demonstrated in a number of tests on a typical lubricant composition containing the sulfur compound. 0.25% by weight of the sulfur compound is added to a solvent-refined SAE 30 mineral lubricating oil containing 7 mM/kg. (millimoles per kilogram) of calcium petroleum sulfonate, 16 mM/kg. sulfurized calcium cetyl phenate, and 6 mM/kg. zinc butylhexyl dithiophosphate along with 0.001% of a typical silicone foam inhibitor known to the trade as Dow-Corning 200.

In the L-4 engine test the oxidation and corrosion inhibiting characteristics of the illustrative lubricant composition described above are determined in a Chevrolet standard six-cylinder engine. The standard test is more fully described in the CRC Handbook, 1946 edition, Coordinating Research Council, New York, New York.

In the test, weighed copper-lead test bearings and new piston rings are installed in the engine. The test is run at a constant engine speed of about 3000 R. P. M. under a load of 30 brake horsepower for a total of 36 hours subsequent to a run-in period of eight hours. The outlet temperature of the coolant is 200° F. and the oil sump temperature is 280° F. At the conclusion of the test, the engine is dismantled and inspected for varnish and sludge deposits and the various parts are rated on a cleanliness scale of 0 to 10 with a total of 50 each for varnish and sludge deposits being perfect. The bearings are weighed to determine the weight loss per whole bearing due to corrosion. For the purposes of the present test more severe conditions are desirable and the duration of the test is extended to 72 hours.

The illustrative test data in the above table shows that the sulfur compounds prepared according to the superior new one-step process of this invention are very effective oxidation and corrosion inhibitors in typical lubricant compositions for internal combustion engines. The data also shows that the sulfur compound produced at a great saving in the single-step process of the invention employing mild reaction conditions is fully equivalent to similar sulfur compounds prepared by the more complicated and expensive two-step procedure.

The lubricating oil compositions described above are also further evaluated for their effectiveness in gasoline-type internal combustion engines by a test which is termed the "L-4 strip corrosion test" because of its correlation with the L-4 Chevrolet engine test. In the test, a polished copper-lead strip is weighed and immersed in 300 ml. of test oil contained in a 400 ml. lipless Berzelius beaker. The test oil is maintained at about 295° F. under a pressure of one atmosphere of air and stirred with a mechanical stirrer at 1000 R. P. M. After two hours a synthetic naphthenate catalyst is added to provide catalytic metals in duplication of gasoline engine operation.

Table II

| Additive and Oil | Wt. Loss, Mg./ Whole Bearing | Cleanliness Varnish and Sludge |
|---|---|---|
| Uncompounded oil alone | More than 1,000 (shut down) | |
| 0.25% by wt. one-step sulfurized diparaffin wax polysulfide | 451 | 99.5 |
| 0.25% by wt. two-step sulfurized diparaffin wax polysulfide | 404 | 99.6 |

Table III

| Additive and Oil | Copper-Lead Strip Wt. Loss (Mgs.) |
|---|---|
| None—Compounded Oil alone | 250+ |
| 0.25% by weight one-step sulfurized diparaffin wax polysulfide in compounded oil | 2.7 |
| 0.25% by weight two-step sulfurized diparaffin wax polysulfide in compounded oil | 3.0 |

From the above test results it is seen that the corrosion of the copper-lead metal is substantially inhibited by the presence of the sulfurized diparaffin wax polysulfide product of the one-step process of the invention and that the product is fully as effective as the product of the more complicated and costly two-step procedure for producing sulfurized diparaffin wax polysulfides.

We claim:

1. A one-step process for preparing sulfur-containing derivatives of paraffin wax which comprises reacting a halogenated paraffin wax with sulfur and an inorganic sulfide selected from the group consisting of alkali metal sulfide and ammonium sulfide in the presence of a lower alkanol of not more than 7 carbon atoms at a temperature of from about 200 to about 250° F. and a pressure of from about 25 to about 75 pounds per square inch for a period of from about two to about ten hours.

2. A one-step process for preparing sulfur-containing derivatives of paraffin wax which comprises reacting a chlorinated paraffin wax with sulfur and an alkali metal sulfide in the presence of a lower alkanol of not more than 7 carbon atoms at a temperature of from about 200 to about 250° F. and a pressure of from about 25 to about 75 pounds per square inch for a period of from about two to about ten hours.

3. A one-step process for preparing sulfur-containing derivatives of paraffin wax which comprises reacting a chlorinated paraffin wax containing from about 20 to about 30 percent by weight chlorine with sulfur and an alkali metal sulfide in the presence of a lower alkanol of not more than 7 carbon atoms at a temperature of from about 200 to about 250° F. and a pressure of from about 25 to about 75 pounds per square inch for a period of from about two to about ten hours.

4. A one-step process for preparing sulfur-containing derivatives of paraffin wax which comprises reacting a chlorinated paraffin wax containing from about 20 to about 30 percent by weight of chlorine with sulfur and a sodium sulfide in the presence of a lower alkanol of not more than 7 carbon atoms at a temperature of from about 220 to about 240° F. and a pressure of from about 35 to about 55 pounds per square inch for a period of from about two to about ten hours.

5. A one-step process for preparing sulfur-containing derivatives of paraffin wax which comprises reacting a chlorinated paraffin wax containing from about 20 to about 30 percent by weight of chlorine with sulfur and a sodium sulfide in the presence of a lower alkanol of not more than 7 carbon atoms at a temperature of from about 220 to about 240° F. and a pressure of from about 35 to about 55 pounds per square inch for a period of from about two to about ten hours, said sulfur being present in a molar excess over said sodium sulfide.

References Cited in the file of this patent

UNITED STATES PATENTS

| | | |
|---|---|---|
| 2,611,766 | Schneider et al. | Sept. 23, 1952 |
| 2,726,236 | Van Ess et al. | Dec. 6, 1955 |